US012474904B1

(12) United States Patent
Bajracharya et al.

(10) Patent No.: US 12,474,904 B1
(45) Date of Patent: Nov. 18, 2025

(54) APPLICATION PROGRAMMING INTERFACE RESOURCE RETRIEVAL

(71) Applicant: Amazon Technologies, Inc., Seattle, WA (US)

(72) Inventors: Sushil Krishna Bajracharya, Arlington, MA (US); Philipp Carl Trucksaess, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 18/066,882

(22) Filed: Dec. 15, 2022

(51) Int. Cl.
*G06F 8/41* (2018.01)

(52) U.S. Cl.
CPC .............. *G06F 8/427* (2013.01); *G06F 8/433* (2013.01); *G06F 8/436* (2013.01)

(58) Field of Classification Search
CPC ........................................................ G06F 8/73
USPC ......................................................... 717/143
See application file for complete search history.

(56) References Cited

U.S. PATENT DOCUMENTS

| | | | | |
|---|---|---|---|---|
| 8,656,365 | B2* | 2/2014 | Rama | G06Q 10/06 717/129 |
| 8,719,805 | B2* | 5/2014 | Zhao | G06F 8/427 717/148 |
| 9,361,071 | B2* | 6/2016 | Vanags | G06F 8/31 |
| 9,430,534 | B2* | 8/2016 | Bhattacharya | G06F 21/6227 |
| 9,521,040 | B2* | 12/2016 | Vergara | H04L 67/02 |
| 9,563,420 | B2* | 2/2017 | Osminer | G06F 9/44589 |
| 10,235,533 | B1* | 3/2019 | Thoren | G06F 16/252 |
| 10,572,370 | B2* | 2/2020 | Bahrami | G06F 11/3684 |
| 10,740,215 | B2* | 8/2020 | Lowe | G06F 9/44526 |
| 10,761,838 | B2* | 9/2020 | Roy | G06F 16/3338 |
| 10,983,782 | B1* | 4/2021 | Mitra | G06F 8/65 |
| 11,113,029 | B2* | 9/2021 | Ying | G06N 20/00 |
| 11,307,913 | B2* | 4/2022 | Cho | G06F 9/541 |
| 11,429,400 | B2* | 8/2022 | Silvert | G06F 9/451 |

(Continued)

FOREIGN PATENT DOCUMENTS

| | | | | |
|---|---|---|---|---|
| CN | 106569947 | A | * 4/2017 | G06F 11/3684 |
| CN | 108021390 | A | * 5/2018 | |

OTHER PUBLICATIONS

NPL—English Translation for CN-108021390-A.*

(Continued)

*Primary Examiner* — Francisco J Aponte
(74) *Attorney, Agent, or Firm* — Athorus, PLLC

(57) ABSTRACT

Described are systems and methods for identifying and providing resources (e.g., coding examples, discussions, issue trackers, and the like) to developers in connection with application programming interfaces (API). Embodiments of the present disclosure can provide an index of API resource information that includes resource and/or reference information in connection with various APIs, as well as facilitate searching the index for relevant API resources in the index. According to exemplary implementations, portions of source code can be obtained and extracted from source code being developed by a developer and processed to identify APIs being utilized by the developer in the source code. The index can be searched for the identified APIs, and resource information stored and/or maintained in the API resource index in connection with the identified APIs may be retrieved and provided to the developer.

19 Claims, 8 Drawing Sheets

(56) References Cited

U.S. PATENT DOCUMENTS

| | | | | |
|---|---|---|---|---|
| 11,461,470 | B2* | 10/2022 | Ahuja | G06F 9/547 |
| 11,500,914 | B2* | 11/2022 | Kalia | G06F 16/367 |
| 11,693,720 | B1* | 7/2023 | Srinivasan | G06F 9/547 719/328 |
| 11,694,214 | B2* | 7/2023 | Buzek | G06F 16/245 705/318 |
| 2017/0161059 | A1* | 6/2017 | Wood | G06F 9/45558 |
| 2017/0192827 | A1* | 7/2017 | Ghafourifar | G06F 9/541 |
| 2017/0337052 | A1* | 11/2017 | Elkabany | G06F 8/71 |
| 2018/0121320 | A1* | 5/2018 | Dolby | G06F 11/3604 |
| 2018/0165135 | A1* | 6/2018 | Bahrami | G06F 9/541 |
| 2018/0196643 | A1* | 7/2018 | Dolby | H04L 67/025 |
| 2018/0232404 | A1* | 8/2018 | Bhatti | G06F 16/9024 |
| 2018/0248774 | A1* | 8/2018 | Arora | H04L 43/045 |
| 2018/0373507 | A1* | 12/2018 | Mizrahi | G06F 18/24 |
| 2019/0325074 | A1* | 10/2019 | Ghezzi | G06F 9/547 |
| 2021/0373860 | A1* | 12/2021 | Khan | G06F 9/546 |
| 2022/0164182 | A1* | 5/2022 | Hicks | G06Q 30/04 |
| 2023/0031997 | A1* | 2/2023 | Kulkarni | G06N 5/04 |
| 2023/0063880 | A1* | 3/2023 | Gupta | G06F 9/547 |
| 2023/0333917 | A1* | 10/2023 | Lowe | G06F 8/60 |
| 2024/0045662 | A1* | 2/2024 | Jain | G06F 8/43 |

OTHER PUBLICATIONS

Ajam, George, Carlos Rodriguez, and Boualem Benatallah. "API Topic Issues Indexing, Exploration and Discovery for API Community Knowledge." 2020 XLVI Latin American Computing Conference (CLEI). IEEE, 2020.*

Yang, Jinqiu, et al. "Automatically extracting web api specifications from html documentation." arXiv preprint arXiv:1801.08928 (2018).*

Serbout, Souhaila, and Cesare Pautasso. "APIstic: a large collection of OpenAPI metrics." Proceedings of the 21st International Conference on Mining Software Repositories. 2024.*

MARKW-T, et al. "IntelliCode API Usage Examples," www.learn.microsoft.com, Microsoft, Oct. 13, 2022, 2 pages, URL: https://learn.microsoft.com/en-us/visualstudio/intellicode/intellicode-api-usage-examples, obtained Jan. 6, 2023.

* cited by examiner

APPLICATION PROGRAMMING INTERFACE RESOURCE RETRIEVAL

BACKGROUND

As software development increasingly relies on abstractions, the use and reliance on application programming interfaces (APIs) may also increase. In this regard, APIs can be used as fundamental building blocks to leverage various kinds of software components, such as libraries, frameworks, infrastructure, and the like. Although APIs typically provide documentation to assist developers in the use of the APIs, the documentation that is provided for APIs is often insufficient. For example, the documentation accompanying APIs typically does not cover all use cases and error conditions. The documentation can be particularly insufficient in circumstances where developers use multiple APIs in combination.

DETAILED DESCRIPTION

Figure 1:
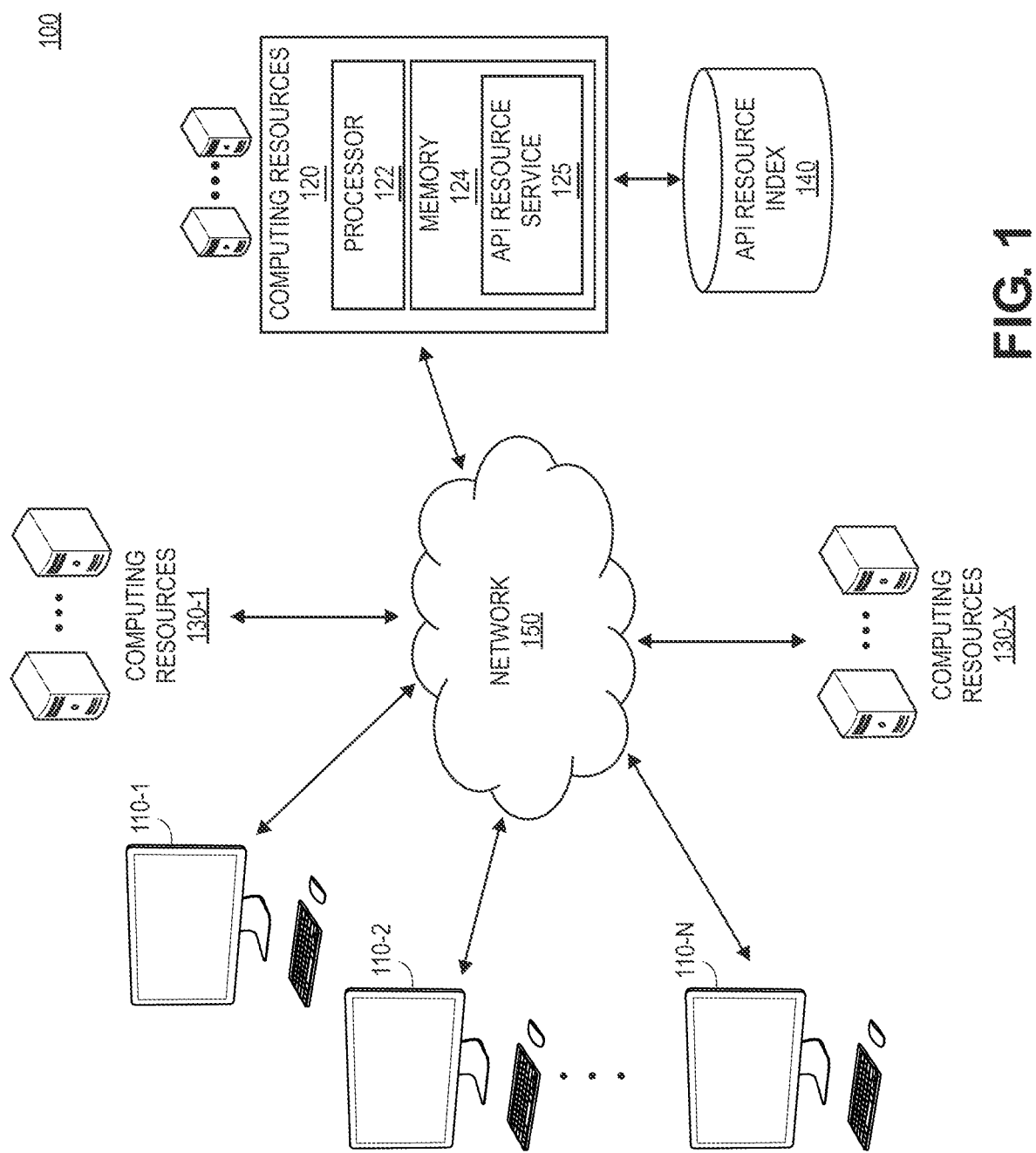
FIG. 1 is an illustration of an exemplary computing environment, according to exemplary embodiments of the present disclosure.

As is set forth in greater detail below, exemplary embodiments of the present disclosure are generally directed to systems, methods, and devices for identifying and providing resources (e.g., coding examples, discussions, issue trackers, and the like) in connection with application programming interfaces (API). According to exemplary embodiments of the present disclosure, an index of API resource information that includes resource and/or reference information in connection with various APIs may be created, updated, stored, and/or maintained. For example, information from various sources may first be crawled and/or ingested, and the information may be processed to extract resource information in connection with various APIs and stored in the index. Additionally, exemplary embodiments of the present disclosure can also facilitate searching the index for relevant API resources in the index. According to exemplary implementations, input information can be obtained and extracted from various sources (e.g., source code from in an integrated development environment (IDE), a browser, etc.). The input information can be processed to identify APIs being utilized, described, or otherwise included in the input information. The index can be searched for the identified APIs, and resource information stored and/or maintained in the API resource index in connection with the identified APIs may be retrieved and provided to a user. Additionally, the API resource information may also be analyzed to determine whether any synthesized resources may be inferred from the API resource information. For example, this can include inferences of relationships between APIs, similarities between APIs, frequencies in being collectively identified as responsive API resource information, and the like.

According to exemplary embodiments of the present disclosure, APIs may be identified (e.g., in connection with building, updating, maintaining, etc. the API resource index and in connection with identifying APIs in the source code being developed by a developer) by extracting names associated with the various identifiers, elements, entities, symbols, etc. in connection with APIs in the information obtained from the crawled and/or ingested resources. For example, the information obtained from the crawled and/or ingested resources can be processed to extract names from the crawled and/or ingested resources. In crawled and/or ingested resources that include source code, portions of the source code may be extracted and parsed into an abstract syntax tree (AST). The AST may be traversed to extract names for identifiers and/or elements (e.g., in connection with classes, functions, variables, etc.), which may be declared, defined, used, and the like in the crawled/ingested resources and/or the portions of source code. According to exemplary embodiments of the present disclosure, each extracted name is preferably resolved to identify a hierarchical access path for the identifier and/or element regardless of where the name is being declared, defined, etc., which may be referred to as a fully qualified name. In connection with the extracted names, other information and/or parameters, such as the type of use (e.g., external vs. internal), and the like may also be identified and associated with each extracted name. Further, in implementations where the crawled and/or ingested information does not include source code, names may be identified, extracted, and/or resolved to fully qualified form based on contextual information (e.g., surrounding artifacts, etc.) included in the crawled and/or ingested information.

In connection with the index of API resource information, after the names have been extracted from the ingested and/or crawled resources, the API resource information obtained from the ingested and/or crawled resource may be stored and/or linked in association with the respective extracted names, so that the index of API resource information may be searched based on the extracted names to access the corresponding API resource information. For example, API resource information, such as example code, natural language discussions/descriptions, issue tracker information, and the like identified in connection with the extracted names may be stored, linked, and/or otherwise associated with the corresponding names extracted from the ingested and/or crawled resources in the index of API resource information. Additionally, the location of the relevant information within the API resource information may also be associated with the name, so as to facilitate efficient retrieval of the relevant information within each particular API resource.

Exemplary embodiments of the present disclosure can also facilitate accessing and/or searching the index of API resources. For example, in an exemplary implementation, an API resource service may be implemented and/or embedded as part of an integrated development environment (IDE) and be configured to search the index of API resource information and provide identified API resource information in connection with source code being developed by a developer using the IDE. Alternatively and/or in addition, the API resource service may be implemented as an extension and/or plug-in in connection with a browser application. Accordingly, in exemplary implementations where the API resource service may obtain portions of source code (e.g., being developed by a developer using an IDE, source code examples on web platforms, etc.), and names may be extracted from the portions of source code by employing similar techniques used in connection with the index of API resource information (e.g., generation and parsing of an AST, etc.).

Further, in implementations where the API resource service code may obtain non-source code information, names may be identified, extracted, and/or resolved to fully qualified form based on contextual information (e.g., surrounding artifacts, etc.) included in the non-source code information. Again, the extracted names are preferably resolved to fully qualified names. The extracted names may then be used to search the index of API resource information, and the associated API resource information may be retrieved and/or presented (e.g., via a user interface of the IDE, a user interface of a browser, or other application) to the user to provide the user with relevant API resource information. According to certain aspects of the present disclosure, only portions of particular API resource information (e.g., the portions within the API resource information that include the relevant information corresponding to the names used to search the index) may be retrieved and/or presented to the user. Optionally, a natural language search, query refinement, and other search features may also be provided to the developer. According to certain aspects of the present disclosure, the search may be performed while the developer is writing the source code, at run-time, at compile-time, upon identification of errors, and the like.

Advantageously, exemplary embodiments of the present disclosure can facilitate identifying and provisioning API resource information to developers in circumstances where developers are using more than one API in combination. Accordingly, exemplary embodiments of the present disclosure may determine and/or identify API resource information in connection with the combinations of APIs being used by the developers. Further, exemplary embodiments of the present disclosure can also identify one or more alternate APIs (e.g., APIs that perform similar functions, etc.) for a developer to consider in circumstances where developers may be migrating source code to a new system and may desire information in connection with APIs associated with the new system that may perform similar functions to APIs being used in connection with the old system from which the source code is being migrated, as well as provide resource information beyond coding examples, such as natural language resources, discussions, forum posts, and the like. According to certain aspects of the present disclosure, the API resource information may be analyzed to infer and/or synthesize resource information from the API resource information. Further, although the exemplary embodiments of the present disclosure are primarily described with respect to utilizing names in connection with resource information associated with APIs, aspects of the present disclosure may be applicable for various other implementations.

FIG. 1 is an illustration of an exemplary computing environment 100, according to exemplary embodiments of the present disclosure.

As shown in FIG. 1, computing environment 100 may include one or more client devices 110 (e.g., client device 110-1, 110-2, through 110-N), also referred to as user devices, for connecting over network 150 to access online applications, services, computing platforms, servers, and the like, such as API resource service 125, that may be executed and/or implemented on one or more computing resources 120. Further, computing resources 120 may access, via network 150, one or more computing resources 130 (e.g., computing resources 130-1 through 130-X), which may be configured to host one or more resources from which computing resource 120 and/or API resource service 125 executing thereon may obtain API resource information. Accordingly, computing resources 120 may communicate with one or more data stores that may be configured to store and/or maintain API resource index 140, which may include an index of API resource information obtained from such resources hosted by computing resources 130.

Client devices 110 may include any type of computing devices, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 110 and computing resources 120. Computing resources 120 may be representative of computing resources that may form a portion of a larger networked computing platform (e.g., a cloud computing platform, and the like), which may be accessed by client devices 110. Further, computing resources 120 may provide various services and/or resources and do not require end-user knowledge of the physical premises and configuration of the system that delivers the services. For example, computing resources 120 may include "on-demand computing platforms," "software as a service (Saas)," "infrastructure as a service (IaaS)," "platform as a service (PaaS)," "platform computing," "network-accessible platforms," "data centers," "virtual computing platforms," and so forth. Computing resources 120 may include one or more processors 122 and one or more memory 124 (or other storage components). Further, API resource service 125 may be stored in memory 124 and may be configured to be executed by one or more processor 122 of remote computing resources 120. Example components of a computing resource implementing computing resources 120 are discussed below with respect to FIG. 7.

As illustrated in FIG. 1, one or more of client devices 110 may access computing resource 120, via network 150. For example, one or more client devices 110 may access computing resource 120 to access and execute various services and/or applications hosted by computing resource 120, such as an integrated development environment (e.g., a web-based IDE and/or a cloud-based IDE), an API resource service, etc. According to certain aspects of the present disclosure, the API resource service may also be implemented and/or embedded in an IDE service, which may also be hosted and/or executed on computing resources 120. Alternatively and/or in addition, the API resource service may be implemented as a browser extension and/or a plug-in. Accordingly, as a user is developing source code using the IDE hosted by computing resources 120, browsing web content, and the like, the user may access and execute the API resource service, which can facilitate searching of API resource index 140 using the various input information (e.g., source code that the developer is developing in an IDE, information that the user is browsing in a browser, etc.) to identify and provide relevant API resource information to the user.

According to exemplary embodiments of the present disclosure, API resource service 125 executing on computing resources 120 may be configured to create, build, and/or maintain API resource index 140, as well as query API resource index 140 to identify and provide relevant API resource information. In connection with creating, building, and/or maintaining API resource index 140, API resource service 125 may periodically ingest and/or crawl networked resources (e.g., hosed by computer resources 130, etc.) which may include API documentation, source code repositories, discussion forums, issue tracking platforms, code review platforms, blog posts, stack trace information, runtime trace information, other web content, and the like. API resource service 125 may then process the ingested and/or crawled information to identify and extract API resource information, which may be stored and/or maintained in API resource index 140. For example, the ingested and/or crawled information may include source code information that may be processed and parsed into an abstract syntax tree (AST) that can be traversed to extract names of identifiers and/or elements in the ingested and/or crawled information. Alternatively and/or in addition, the ingested and/or crawled information may include non-source code information, from which names may be extracted based on contextual information and/or surrounding artifacts. Preferably the extracted names may be resolved to a full hierarchical access for each identifier and/or element, which may be referred to herein as a fully qualified name. Accordingly, the extracted names and/or fully qualified names may be stored and/or otherwise maintained in API resource index 140 to facilitate identification and retrieval of API resource information associated with the extracted names and/or fully qualified names.

According to exemplary embodiments of the present disclosure, the extracted names and/or fully qualified names may be stored in API resource index 140. Alternatively and/or in addition, identifiers representative of the extracted names and/or fully qualified names may be determined and stored in API resource index 140. For example, a trained machine learning model may be configured to generate embeddings representative of the extracted names and/or the fully qualified names, and the embeddings may be stored and/or maintained in API resource index 140.

Additionally, API resource service 125 may facilitate searching, accessing, and/or providing relevant API resource information to users. In the exemplary implementation illustrated in FIG. 1A, a developer may, via, for example, client device 110-1, execute and access API resource service 125 while developing source code, browsing web content, and/or executing other applications in connection with APIs. For example, API resource service 125 may be implemented in and/or in conjunction with an integrated development environment, a web browser, or other application that is being utilized by the user. Accordingly, based on the activities of the user, information, such as portions of the source code that the user may be developing, content the user may be browsing, etc., may be provided to API resource service 125. The information provided to API resource service 125 may be initiated via an interaction with API resource service 125 by the user, a command at run-time, compile-time, etc. of the source code, upon detection of an error in the source code by the IDE, via an application running the background, a browser extension and/or plug-in, and the like. In exemplary implementations where API resource service 125 is implemented and/or embedded in an IDE, in the event that an error is detected, the portions of the source code causing the error may be provided to API resource service 125. Similar to the crawled and/or ingested resource, the information received by API resource service 125 may be processed to identify and extract names of identifiers and/or elements in the information. In exemplary implementations where the information includes source code, the source code may be processed and parsed into an abstract syntax tree (AST) that can be traversed to extract the names, as well as other parameters (e.g., such as a classification, surrounding artifacts, etc.), from the source code. In other implementations where the information includes non-source code information (e.g., web content such as blogs, discussions, forums, articles, etc.), names may be identified, extracted, etc. based on contextual information (e.g., surrounding artifacts, etc.) included in the non-source code information. Preferably the extracted names may be resolved to a fully qualified name. In certain exemplary implementations, the extracted names and/or fully qualified names may be further processed to generate an identifier or other representation of the extracted names and/or fully qualified names. Optionally, the identifiers and/or other representations may also represent other parameters, such as a classification (e.g., used, external, declared, etc.) and the like, associated with the names and/or fully qualified names. For example, a trained machine learning model may be configured to generate embeddings that are representative of the extracted names and/or fully qualified names (as well as other parameters) in an embedding space.

The extracted names may then be submitted as a query to API resource index 140, and, in response to the query, API resource information responsive the query may be identified and provided to the user. For example, the query may be performed as a lexical search, a semantic search, and the like. Additionally, the API resource information may also be analyzed to determine whether any synthesized resources may be inferred from the API resource information. For example, this can include inferences of relationships between APIs, similarities between APIs, frequencies in being collectively identified as responsive API resource information, and the like. In exemplary implementations where the names and/or fully qualified names extracted from the ingested and/or crawled resources are stored as embeddings, the queries formed from the names and/or fully qualified names extracted from the information may also be provided to the trained machine learning system to generate embeddings representing the names and/or fully qualified names extracted from the source code. For example, the embeddings may be representative of all the names and/or fully qualified names included in a query that were extracted from the information. Accordingly, in exemplary implementations where embeddings are used to represent the names and/or fully qualified names, searching API resource index 140 may include determining similarity measures between the relevant embeddings (e.g., cosine similarity, employing clustering techniques, and the like).

According to exemplary embodiments of the present disclosure, the API resource information may include, for example, coding examples, discussions, blog posts, information regarding combinations of APIs being used in the source code, alternate APIs that may be used in the source code, error tracking information, stack trace information, runtime trace information, other web content, and the like. Optionally, API resource service 125 may be configured to augment the query with a natural language search, a query refinement option (e.g., with an extracted name, a natural language query, etc.), and the like. In exemplary implementations where embeddings may be used, any augmentation of the query may also be provided to the trained machine learning system to generate an embedding representative of the query, including any additional parameters used to augment the query.

Figure 2:
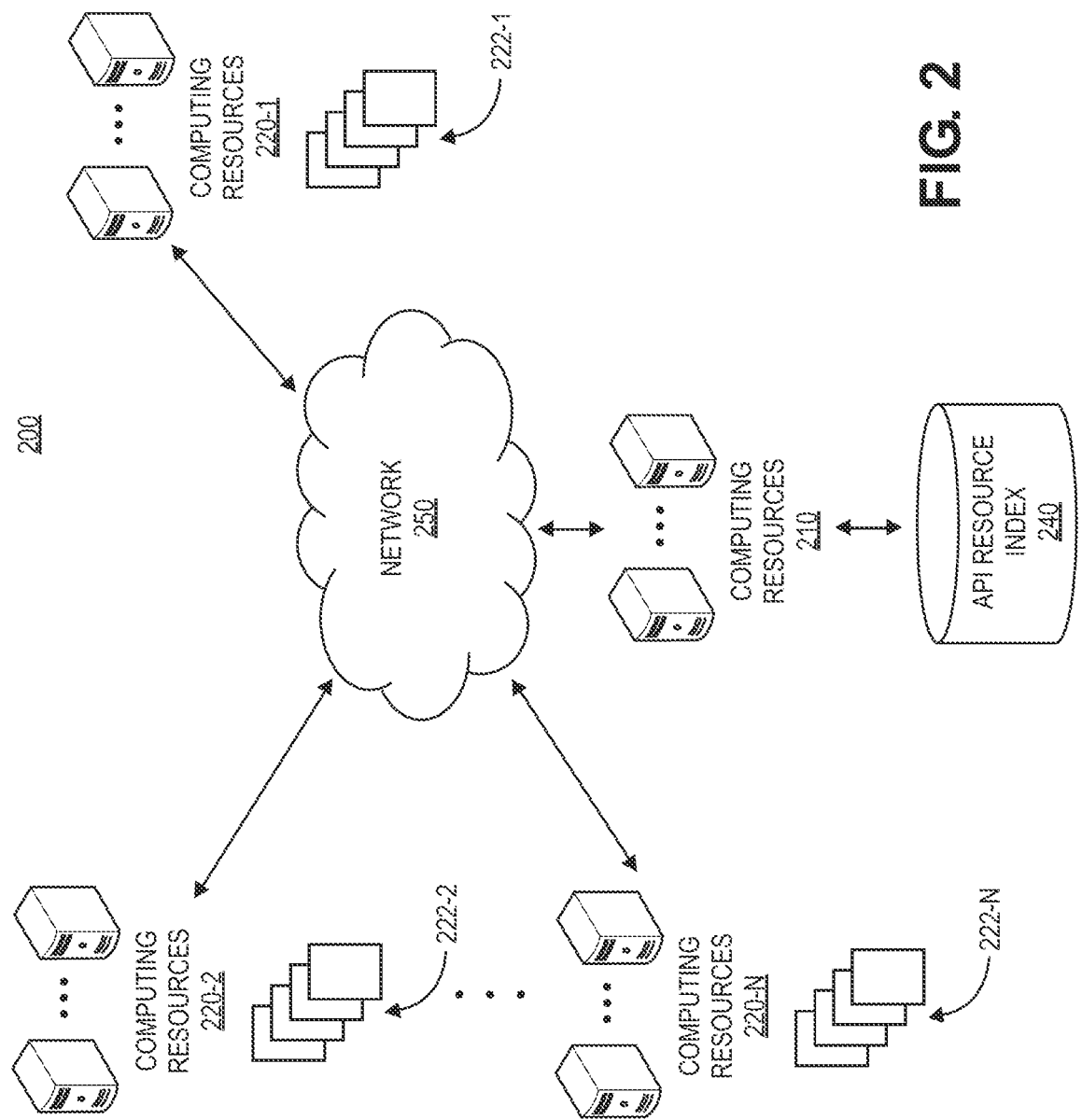
FIG. 2 is an illustration of an exemplary computing environment, according to exemplary embodiments of the present disclosure.

FIG. 2 is an illustration of an exemplary computing environment 200, according to exemplary embodiments of the present disclosure. FIG. 2 illustrates an exemplary implementation of an exemplary computing environment 200 that may facilitate building, updating, and/or maintaining an exemplary index for API resources, such as API resource index 240, which may be stored and maintained on a datastore that is configured to be in communication with computing resources 210.

As shown in FIG. 2, computing resources 210 may communicate with computing resources 220 (e.g., computing resources 220-1, 220-2, through 220-N) via network 250 to obtain resource information from one or more of computing resources 220. As illustrated in FIG. 2, each computing resource may host various content and/or materials, such as resource information 222-1, 222-2, and 222-N, respectively. For example, computing resources 220 may host resources such as API documentation published in connection with various APIs, source code repositories (e.g., GitHub, etc.), discussion forums (e.g., Stack Overflow, etc.), issue tracker platforms, code review platforms, blog posts, other websites, stack trace information, runtime trace information, and the like, that may publish, host, and/or otherwise make available resource information 222-1, 222-2, through 222-N in connection with various APIs.

According to exemplary embodiments of the present disclosure, an API resource service executing on computing resources 210 may ingest and/or crawl resource information 222-1, 222-2, through 222-N hosted on one or more of computing resources 220. The ingested and/or crawled resource information 222-1, 222-2, through 222-N may be processed to build, update, and/or otherwise maintain API resource index 240. According to exemplary implementations of the present disclosure, resource information 222-1, 222-2, through 222-N may be processed to extract source code embedded in resource information 222-1, 222-2, through 222-N. For example, source code obtained from source code repositories may be packaged as complete projects, source code obtained from discussions forums, blog posts, other websites, and the like may be in the form of portions and/or snippets of source code that were embedded in such platforms, etc. Alternatively and/or in addition, in exemplary implementations where resource information 222-1, 222-2, and/or 222-N include non-source code information, names may be identified, extracted, and/or resolved to fully qualified form based on contextual information (e.g., surrounding artifacts, etc.) included in the non-source code information.

Based on the understanding that identifier and/or elements of APIs (e.g., classes, functions, variables, etc.) may be identified using uniquely identifiable names, the information and/or source code extracted from resource information 222-1, 222-2, through 222-N may be further processed to extract names of identifiers and/or elements of APIs in the information and/or extracted source code. According to exemplary embodiments of the present disclosure, the extracted source code may be parsed into an abstract syntax tree (AST). The AST may be traversed, and along with additional parameters associated with the source code, such as dependencies, build manifests, folder structures, and the like, names of identifiers and/or elements of APIs may be identified and extracted. For non-source code information, names may be identified, extracted, and/or resolved to fully qualified form based on contextual information (e.g., surrounding artifacts, etc.) included in the non-source code information. For example, the information may be parsed to identify names based on formatting, syntax, surrounding text and/or artifacts, etc. in the information.

Although the identified names are preferably resolved to fully qualified names, which may include the full hierarchical access path for the identified and/or extracted names regardless of where the name is being declared, defined, used, and the like, certain names that are identified and extracted from the source code may only be locally identifiable based on, for example, the namespace in which the extracted names are being declared, used, etc. Accordingly, to resolve the extracted names to fully qualified names, various information and/or parameters associated with the identified and/or extracted names, such as dependencies, build manifests, folder structures, and the like, as well as any available natural language information (e.g., code comments, in discussion forums, blog posts, etc.) may be used, in addition to non-source code information and the information obtained via the traversal of the AST, in resolving names to a fully qualified form. Further, known API resource information may also be leveraged to resolve names to a fully qualified form. According to exemplary embodiments of the present disclosure, API documentation, resource information, and the like may be analyzed to determine contextual information associated with names appearing in the API documentation and/or resource information, which may also be utilized to facilitate resolving names to fully qualified form. For example, it may be determined from the API documentation and/or resource information how certain names are used, types/objects that certain expressions may return, any related and/or corresponding code elements (e.g., functions, variables, etc.), and if any such similar contextual information is identified in the non-source code information and/or the extracted source code information, such contextual information may be utilized to facilitate determination of the fully qualified names.

After the names have been extracted, and resolved to a fully qualified form where possible, the names and/or the fully qualified names are stored and/or otherwise maintained in API resource index 240. Further, additional parameters and/or information associated with the names may also be stored in association with the names and/or the fully qualified names in API resource index 240. For example, the location of where the names and/or the fully qualified names appear in the corresponding API resource information, classifications associated with the names and fully qualified names based on how the names and/or fully qualified names appear in the source code, such as whether the names and/or fully qualified names are declared (e.g., identifiers and/or elements that are defined, introduced, and/or imported in the source code), used (e.g., used in the source code), and/or external (e.g., a subset of used names and/or fully qualified names that are used or defined in the same source code unit) may also be stored in association with the names and/or fully qualified names. It may be understood that the names and/or fully qualified names that are classified as external are typically associated with APIs.

According to exemplary embodiments of the present disclosure, rather than storing the names and/or fully qualified names themselves, identifiers that are representative of the extracted names and/or fully qualified names may be determined and stored in API resource index 240. For example, a trained machine learning model may be configured to generate embeddings representative of the extracted names and/or the fully qualified names, as well as any additional parameters and/or information associated with the names and/or the fully qualified names, and the embeddings may be stored and/or maintained in API resource index 240.

Queries may then be input to API resource index 240, which may be configured to facilitate efficient retrieval of various resource information from resource information 222-1, 222-2, through 222-N in response to queries that include one or more names and/or fully qualified names. For example, queries may be performed as a lexical search, a semantic search, and the like. Additionally, resource information 222-1, 222-2, through 222-N may also be analyzed to determine whether any synthesized resources may be inferred from resource information 222-1, 222-2, through 222-N. For example, this can include inferences of relationships between APIs, similarities between APIs, frequencies in being collectively identified as responsive API resource information, and the like. Alternatively and/or in addition, in exemplary implementations where the names and/or fully qualified names extracted from the ingested and/or crawled resources are stored as embeddings, queries may be submitted as embeddings and searching API resource index 240 may include determining similarity measures between the relevant embeddings (e.g., cosine similarity, employing clustering techniques, and the like). According to exemplary embodiments of the present disclosure, the embeddings may represent a query including more than one name and/or fully qualified name, query augmenting parameters, parameters associated with the names and/or fully qualified names, and the like.

Further, the API resource service executing on computing resources 210 may periodically ingest and/or crawl and process resource information 222-1, 222-2, through 222-N hosted on one or more of computing resources 220 to continuously update and/or maintain API resource index 240.

Figure 3:
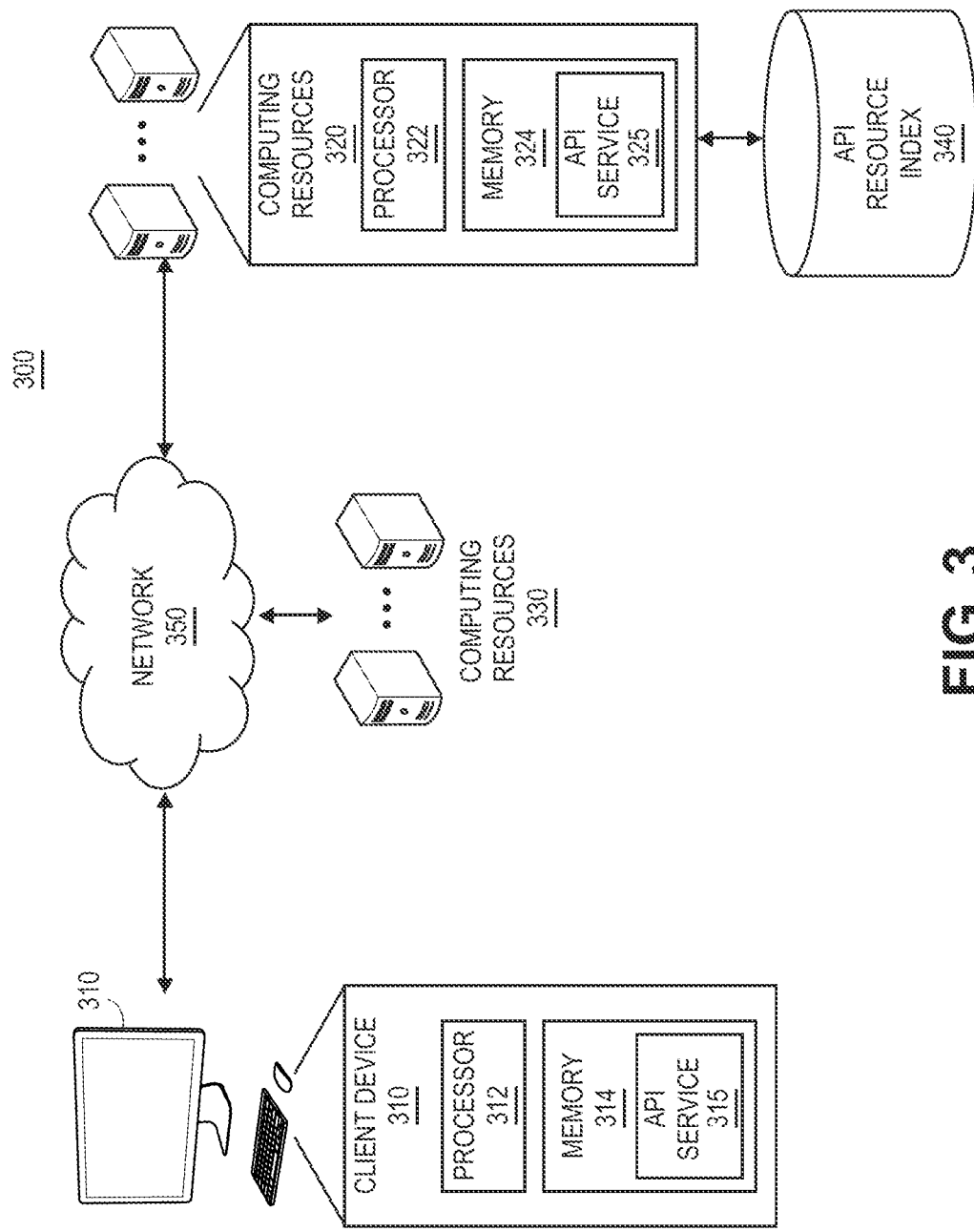
FIG. 3 is a block diagram of an exemplary computing environment, according to exemplary embodiments of the present disclosure.

FIG. 3 is a block diagram of an exemplary computing environment 300, according to exemplary embodiments of the present disclosure. FIG. 3 illustrates an exemplary implementation where API resource information may be retrieved and provided to a user.

As shown in FIG. 3, client device 310 may access computing resources 320 via network 350. Client device 310 may include one or more applications, such as API service 315, which may be stored in memory 314 and configured to be executed by one or more processors 312. Further, computing resources 320 may also include one or more applications, such as API service 325, which may be stored in memory 324 and configured to be executed by one or more processors 322. Computing resources 320 may also be in communication with API resource index 340, which may include an index of names and/or fully qualified names associated with API resource information that may be stored and/or hosted by computing resources 330.

In the exemplary implementation illustrated in FIG. 3, API service 315 may communicate, via network 350, with API service 325 to search API resource index 340 to identify, access, and/or retrieve API resource information, which may be stored and/or hosted by computing resources 330, in connection with source code being developed by a user of client device 310. For example, in addition to API service 315 and API service 325, client device 310 and computing resources 320 may also provide an integrated development environment (IDE) service. Accordingly, API service 315 and/or API service 325 may be implemented and/or embedded in the IDE service to facilitate retrieval of API resource information in connection with source code being developed using the IDE service. Alternatively and/or in addition, API service 315 and/or API service 325 may be implemented as a browser extension and/or plug-in executing in connection with an application (e.g., a web browser, etc.) on client device 310.

According to exemplary embodiments of the present disclosure, as a user associated with client device 310 develops source code using the IDE service on client device 310, consumes or otherwise consumes API related content, and the like, API service 315 and API service 325 may ingest and process the source code being developed by the user in the IDE and/or the non-source code information associated with the user's consumption of API related content to query API resource index 340 to identify and/or retrieve API resource information that may assist the user in the development of source code. For example, API service 315 and/or API service 325 may execute in the background of the IDE service to monitor the source code being developed by the user to obtain portions of the source code being developed by the user, may execute as a browser extension and/or plug-in, and the like. Alternatively and/or in addition, the source code and/or non-source code information may be obtained and/or ingested by API service 315 and API service 325 via an interaction with the IDE, browser, or other application by the user (e.g., selection of source code and/or non-source code information for which the user desires to obtain API resource information), execution of certain commands (e.g., compiling the source code, running the source code, debugging the source code, etc.), upon detection of an error and/or fault in the source code, and the like. For example, in the event that an error is detected, the portions of the source code causing the error may be provided to API service 315 and/or API service 325.

Similar to the exemplary implementation of the present disclosure described with respect to FIG. 2 in connection with building, maintaining, and/or updating an index for API resource information, the obtained source code and/or non-source code information may be further processed to extract names of identifiers and/or elements of APIs used in the obtained source code and/or included in the non-source code information. According to exemplary embodiments of the present disclosure, the extracted source code may first be parsed into an abstract syntax tree (AST). The AST may be traversed, and along with additional parameters associated with the source code, such as dependencies, build manifests, folder structures, and the like, names of identifiers and/or elements of APIs may be identified and extracted. Further, in implementations where the API resource service code may obtain non-source code information, names may be identified, extracted, and/or resolved to fully qualified form based on contextual information (e.g., surrounding artifacts, etc.) included in the non-source code information. Although the identified names are preferably resolved to fully qualified names, which may include the full hierarchical access path for the identified and/or extracted names regardless of where the name is being declared, defined, used, and the like, certain names that are identified and extracted from the source code may only be locally identifiable based on, for example, the namespace in which the extracted names are being declared, used, etc.

Accordingly, to resolve the extracted names to fully qualified names, various information and/or parameters associated with the identified and/or extracted names, such as dependencies, build manifests, folder structures, contextual information associated with how the names are used in the source code, and the like, as well as any available natural language information (e.g., code comments, in discussion forums, blog posts, etc.) may be used, in addition to the information obtained via the traversal of the AST, in resolving names to a fully qualified form. Further, known API resource information may also be leveraged to resolve names to a fully qualified form. According to exemplary embodiments of the present disclosure, API documentation, resource information, and the like may be analyzed to determine contextual information associated with names appearing in the API documentation and/or resource information, which may also be utilized to facilitate resolving names to fully qualified form. For example, it may be determined from the API documentation and/or resource information how certain names are used, any related and/or corresponding code elements (e.g., functions, variables, etc.), and if any such similar contextual information is identified in the non-source code information and/or the extracted source code information, such contextual information may be utilized to facilitate determination of the fully qualified names.

Further, additional parameters and/or information associated with the names may also be associated with the names and/or the fully qualified names extracted from the obtained source code and/or non-source code information. For example, the names and fully qualified names may be classified based on how the names and/or fully qualified names appear in the source code and/or non-source code information. This can include whether the names and/or fully qualified names are declared (e.g., identifiers and/or elements that are defined, introduced, and/or imported in the source code), used (e.g., used in the source code), and/or external (e.g., a subset of used names and/or fully qualified names that are used or defined in the same source code unit). It may be understood that the names and/or fully qualified names that are classified as external are typically associated with APIs.

After the names have been extracted, and resolved to a fully qualified form where possible, one or more of the names and/or the fully qualified names may be submitted as a query to API resource index 340 to retrieve relevant API resource information associated with the names and/or the fully qualified names included in the query. For example, the query may be performed as a lexical search, a semantic search, and the like. Optionally, the query may also be configured to allow the user to augment and/or supplement the query with supplemental information and/or parameters. For example, the user may be prompted to include a natural language search in addition to the one or more names and/or fully qualified names that are provided as the query, the user may be able to select or deselect the names and/or fully qualified names to be submitted as the query, the user may be able to select Boolean operators in connection with the names and/or fully qualified names to be submitted as the query, and the like. In exemplary implementations, the query may include an embedding representing all the names and/or fully qualified names that make up the query, including any supplemental information and/or parameters with the query, and searching API resource index 340 may include determining similarity measures between the relevant embeddings (e.g., cosine similarity, employing clustering techniques, and the like). Accordingly, relevant API resource information may be identified, retrieved, and presented to the user on client device 310. According to aspects of the present disclosure, a particular portion and/or location within each identified API resource may be identified based on the query, and only the relevant portions of the identified API resource may be presented to the user, so that the entirety of the API resource is not presented to the user. Additionally, the API resource information may also be analyzed to determine whether any synthesized resources may be inferred from the API resource information. For example, this can include inferences of relationships between APIs, similarities between APIs, frequencies in being collectively identified as responsive API resource information, and the like.

Advantageously, exemplary implementations of the present disclosure can identify API resource information in connection with more than one API that may be used in combination in the source code being developed by the user of client device 310. For example, in exemplary implementations where the user may be utilizing more than one API in combination, the query may include names and/or fully qualified names associated with more than one API, so that API resource information associated with a combination of multiple APIs may be identified and provided to the user. The combination of multiple APIs may be determined, for example, in connection with stack trace information, navigational paths within the source code, dependencies, build manifests, folder structures, and the like, such that use of different APIs in combination across different files may also be identified and determined (e.g., a first API used in a first file of a project and a second API used in a second file of the project, etc.). Optionally, the user of client device 310 may further specify a Boolean operator (e.g., such as AND, OR, etc.) or other indicator to ensure that certain names and/or fully qualified names associated with APIs are searched together.

Further, the natural language searching option that may augment the query of names and/or fully qualified names may facilitate determining an intent of the user of client device 310 in connection with the APIs associated with the names and/or fully qualified names included in the query. In exemplary implementations, the user of client device 310 can supplement the query of names and/or fully qualified names with a natural language query to indicate the purpose of the API, certain information and/or examples that the user is seeking in connection with the APIs used in the source code being developed, and the like. For example, in an example implementation where the user of client device 310 is developing source code to migrate from one system to another, the user may indicate as such in a natural language input. In response to such a natural language input, exemplary embodiments of the present disclosure may identify and retrieve API resource information identifying APIs associated with the new system to which the systems are migrating that perform similar functions to APIs associated with the names and/or fully qualified names extracted from the source code that are included as part of the query. In exemplary implementations where embeddings may be used, any augmentation of the query may also be provided to the trained machine learning system to generate an embedding representative of the query (which may include multiple names and/or fully qualified names) and any supplemental information and/or parameters that may be used to augment a query.

Accordingly, the query, which may include one or more names and/or fully qualified names, along with any additional information and/or parameters, may be used as an input to search API resource index 340. In response to the query, API resource index 340 may be searched to identify and/or retrieve API resource information that is responsive to the query. After responsive API resource information is identified and/or retrieved, the API resource information, identifiers associated with the API resource information, and the like may be presented to the user on client device 310. For example, the API resource information may include example source code, as well as non-source code examples, such as blog posts, discussion forums, and the like, and may be implemented into and presented as part of the user interface of the IDE service running on client device 310, cause another application (e.g., browser, etc.) to be executed and present the API resource information in the other application, and the like. Further, the API resource information that is identified and/or retrieved may be limited to a particular portion and/or location within each identified API resource. The particular portion and/or location within each identified API resource may be identified based on the query (e.g., where the names included in the query appear in the API resource) and only the relevant portions of the identified API resource may be presented to the user, so that the entirety of the API resource is not presented to the user. Additionally, the API resource information may also be analyzed to determine whether any synthesized resources may be inferred from the API resource information. For example, this can include inferences of relationships between APIs, similarities between APIs, frequencies in being collectively identified as responsive API resource information, and the like. Accordingly, the user of client device 310 may access, interact with, or otherwise consume the API resource information presented on client device 310. Optionally, aspects of the present disclosure can present a query refinement option, so that the user of client device 310 can submit a refinement query (e.g., submit a further API name and/or fully qualified name, a natural language search, select one or more of the presented API resource information and request additional similar results, and the like) to refine and/or filter the API resource information that was identified, retrieved, and presented to the user on client device 310.

Figure 4A:
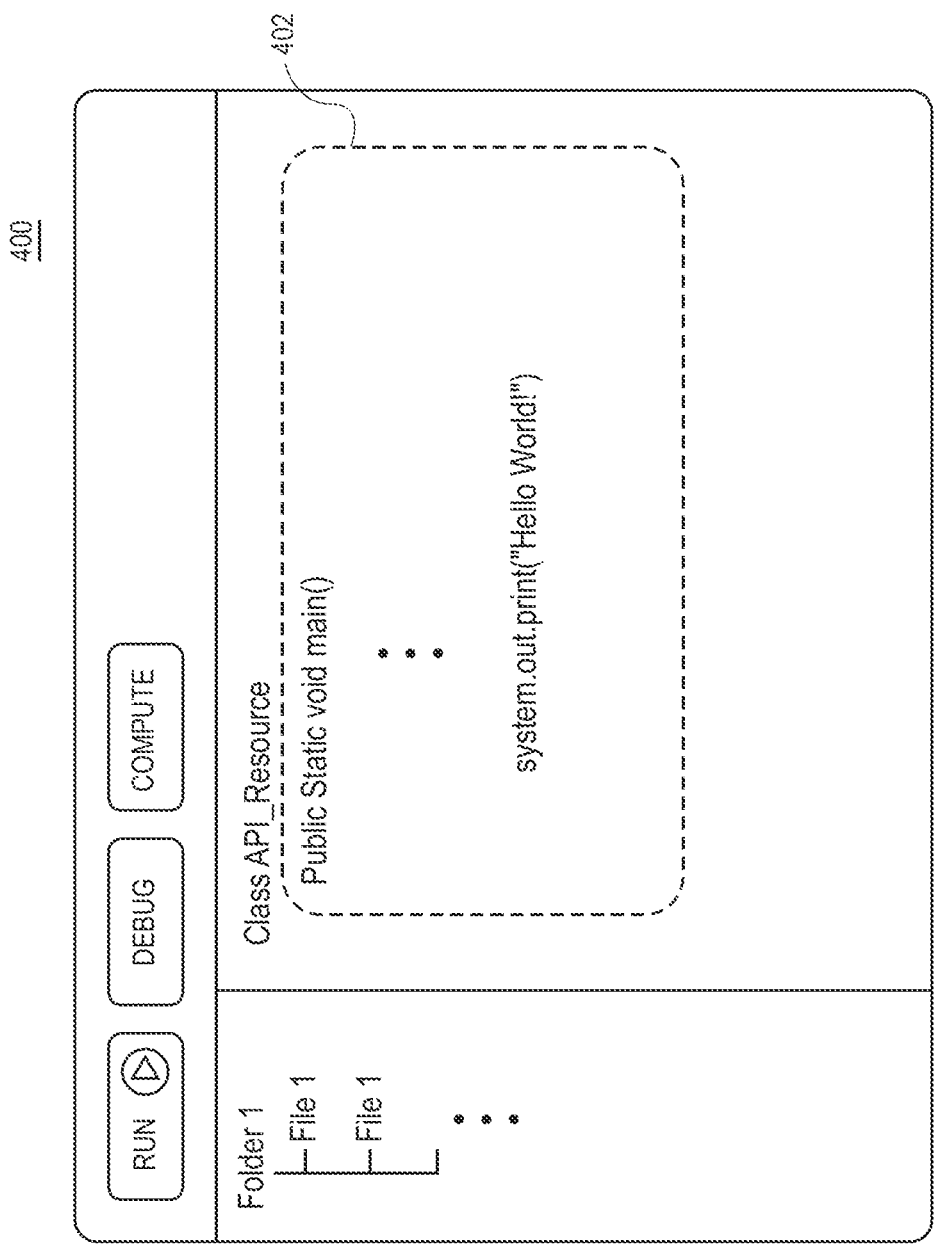
FIGS. 4A and 4B are illustrations of an exemplary graphical user interface, according to exemplary embodiments of the present disclosure.
Figure 4B:
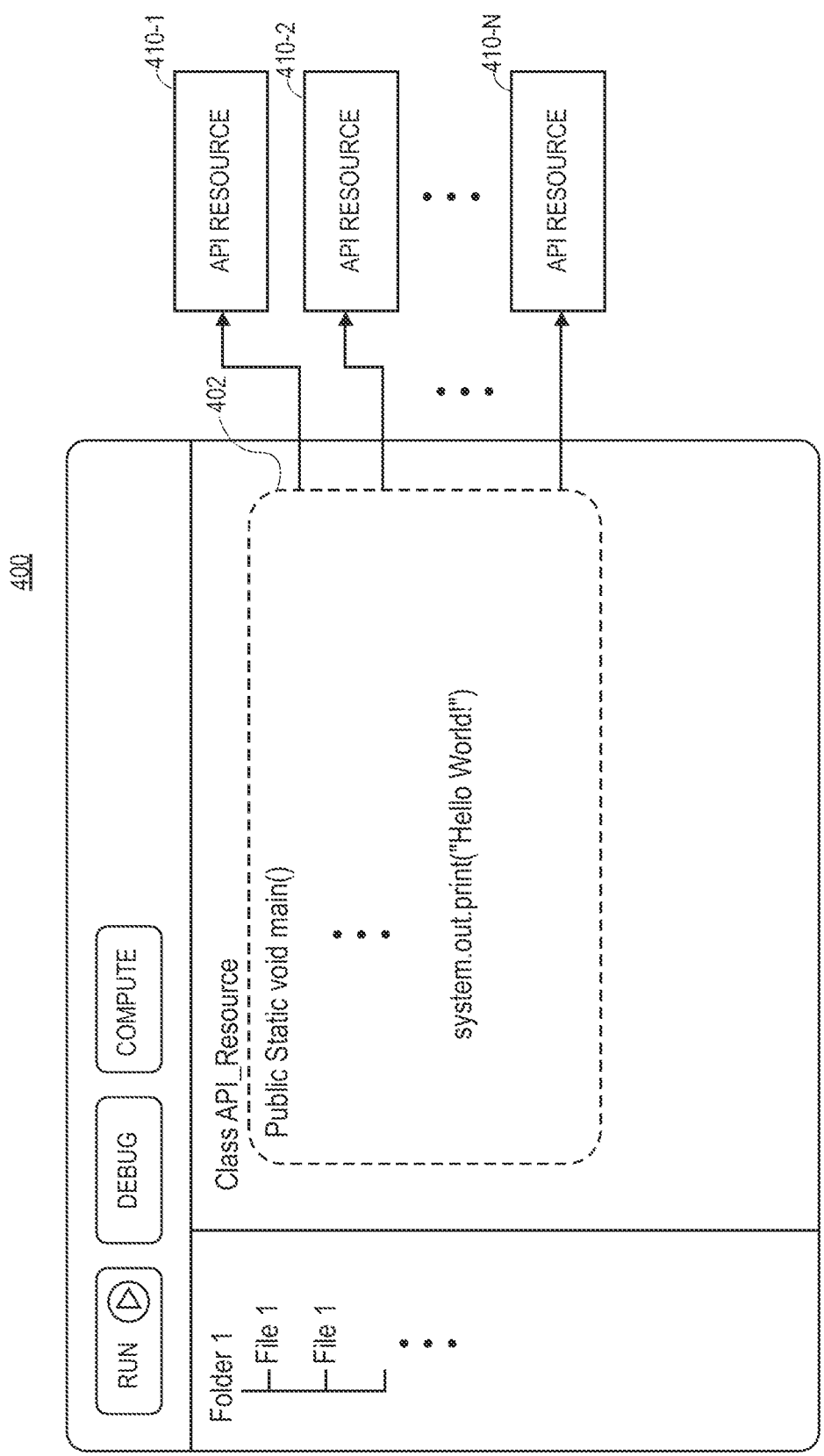

FIGS. 4A and 4B are illustrations of an exemplary graphical user interface 400, according to exemplary embodiments of the present disclosure.

FIGS. 4A and 4B illustrate an exemplary graphical user interface 400 that may be employed in connection with an IDE service in which an API resource service (e.g., API service 315 and/or API service 325) may be implemented and/or embedded. As shown in FIGS. 4A and 4B, graphical user interface 400 may include various features and functions provided by the IDE. For example, graphical user interface 400 may include a text editor where a user of the IDE may write and/or otherwise develop source code 402. Alternatively and/or in addition, exemplary embodiments of the present disclosure may be implemented in connection with other applications (e.g., a browser, etc.) as an extension and/or plug-in.

In an exemplary implementation where a user is utilizing an IDE associated with graphical user interface 400, the user may interact with graphical user interface 400 to access and/or utilize the various features of the IDE, as well as an API resource information service that may be configured to identify and retrieve API resource information in connection with source code 402 that the user may be developing.

According to exemplary embodiments of the present disclosure, as the user is developing source code 402, at least a portion of source code 402 may be provided to and/or ingested by an API resource information service. The API resource information service may be embedded and/or implemented as part of the IDE being used by the user to develop source code, and portions of source code 402 may be obtained and/or ingested by the API resource information service via various different mechanisms. For example, the API resource information service may be configured to run in the background and automatically obtain and parse portions of source code 402 being developed by the user, portions of source code 402 may be selected by the user and provided to the API resource information service by the user via an interaction with graphical user interface 400, portions of source code 402 may be provided to API resource information service at run-time, compile-time, etc. and/or upon detection of an error, warning, fault, etc. at run-time, compile-time, etc., and the like. For example, in the event that an error is detected, the portions of source code 402 causing the error may be provided to API resource information service.

According to exemplary embodiments of the present disclosure, the API resource information service may extract certain information from source code 402 to identify and/or retrieve API resource information based on source code 402. For example, source code 402 may be parsed to extract names, as well as additional information and/or parameters, which can be used to generate a query. The query can be used to search an index of API resource information to identify and retrieve relevant API resource information, such as API resources 410 (e.g., API Resource 410-1, API Resource 410-2, through API Resource 410-N) based on source code 402 being developed by the user.

For example, the obtained source code may be further processed to extract names of identifiers and/or elements of APIs used in the obtained source code. According to exemplary embodiments of the present disclosure, source code 402 obtained and/or ingested by the API resource information service may first be parsed into an abstract syntax tree (AST). The AST may be traversed, and along with additional parameters associated with the source code, such as dependencies, build manifests, folder structures, and the like, names of identifiers and/or elements of APIs may be identified and extracted. Although the identified names are preferably resolved to fully qualified names, which may include the full hierarchical access path for the identified and/or extracted names regardless of where the name is being declared, defined, used, and the like, certain names that are identified and extracted from the source code may only be locally identifiable based on, for example, the namespace in which the extracted names are being declared, used, etc. Accordingly, to resolve the extracted names to fully qualified names, various information and/or parameters associated with the identified and/or extracted names, such as dependencies, build manifests, folder structures, contextual information associated with how the names are used in the source code, and the like, as well as any available natural language information (e.g., code comments, in discussion forums, blog posts, etc.) may be used, in addition to the information obtained via the traversal of the AST, in resolving names to a fully qualified form.

Further, additional parameters and/or information associated with the names may also be associated with the names and/or the fully qualified names extracted from the obtained source code. For example, the names and fully qualified names may be classified based on how the names and/or fully qualified names appear in the source code. This can include whether the names and/or fully qualified names are declared (e.g., identifiers and/or elements that are defined, introduced, and/or imported in the source code), used (e.g., used in the source code), and/or external (e.g., a subset of used names and/or fully qualified names that are used or defined in the same source code unit). It may be understood that the names and/or fully qualified names that are classified as external are typically associated with APIs.

After the names have been extracted, and resolved to a fully qualified form, where possible, one or more of the names and/or the fully qualified names may be submitted as a query to an index of API resource information (e.g., API resource index 140, 240, or 340) to retrieve API resource information associated with the names and/or the fully qualified names included in the query. For example, the query may be performed as a lexical search, a semantic search, and the like. In exemplary implementations where embeddings are used to represent the names and/or fully qualified names, searching the index of API resource information may include determining similarity measures between the relevant embeddings (e.g., cosine similarity, employing clustering techniques, and the like).

Optionally, the query may also be configured to allow the user to augment and/or supplement the query with supplemental information and/or parameters. For example, the user may be prompted to include a natural language search in addition to the one or more names and/or fully qualified names that are provided as the query, the user may be able to select or deselect the names and/or fully qualified names to be submitted as the query, the user may be able to select Boolean operators in connection with the names and/or fully qualified names to be submitted as the query, and the like.

Advantageously, exemplary implementations of the present disclosure can identify API resource information in connection with more than one API that may be used in combination in source code 402. For example, in exemplary implementations where the user may be utilizing more than one API in combination, the query may include names and/or fully qualified names associated with more than one API so that API resource information associated with a combination of multiple APIs may be identified and provided to the user. The combination of multiple APIs may be determined, for example, in connection with stack trace information, navigational paths within the source code, dependencies, build manifests, folder structures, and the like, such that use of different APIs in combination across different files (e.g., a first API used in a first file of a project and a second API used in a second file of the project, etc.) may also be identified and determined. Optionally, the user may further specify a Boolean operator (e.g., such as AND, OR, etc.) or other indicator to ensure that certain names and/or fully qualified names associated with APIs are searched together.

Further, the natural language searching option that may augment the query of names and/or fully qualified names may facilitate determining an intent of the user in connection with the APIs associated with the names and/or fully qualified names included in the query. In exemplary implementations, the user can supplement the query of names and/or fully qualified names with a natural language query to indicate the purpose of the API, certain information and/or examples that the user is seeking in connection with the APIs used in the source code being developed, and the like. For example, in an example implementation where the user is developing source code to migrate source code from one system to another, the user may indicate as such in as a natural language input. In response to such a natural language input, exemplary embodiments of the present disclosure may identify and retrieve API resource information identifying APIs associated with the new system to which the systems are migrating that perform similar functions to APIs associated with the names and/or fully qualified names extracted from source code 402 that are included as part of the query.

Accordingly, the query, which may include one or more names and/or fully qualified names, along with any additional information and/or parameters, may be used as an input to search an index of API resource information. In response to the query, the index of API resource information may be searched to identify and/or retrieve API resource information, such as API resources 410, that is responsive to the query. After responsive API resource information is identified and/or retrieved, API resources 410, identifiers associated with API resources 410, and the like may be presented to the user (e.g., via graphical user interface 400). For example, API resources 410 may include example source code, as well as non-source code examples, such as blog posts, discussion forums, and the like, and may be implemented into and presented via graphical user interface 400 of the IDE, cause another application (e.g., browser, etc.) to be executed and present API resources 410 in the other application, and the like. Accordingly, the user may access, interact with, or otherwise consume API resources 410. Optionally, aspects of the present disclosure can present a query refinement option so that the user can submit a refinement query (e.g., submit a further name and/or fully qualified name associated with an API, a natural language search, select one or more of API resources 410 and request additional similar results, and the like) to refine and/or filter API resources 410 that was identified, retrieved, and presented to the user.

Figure 5:
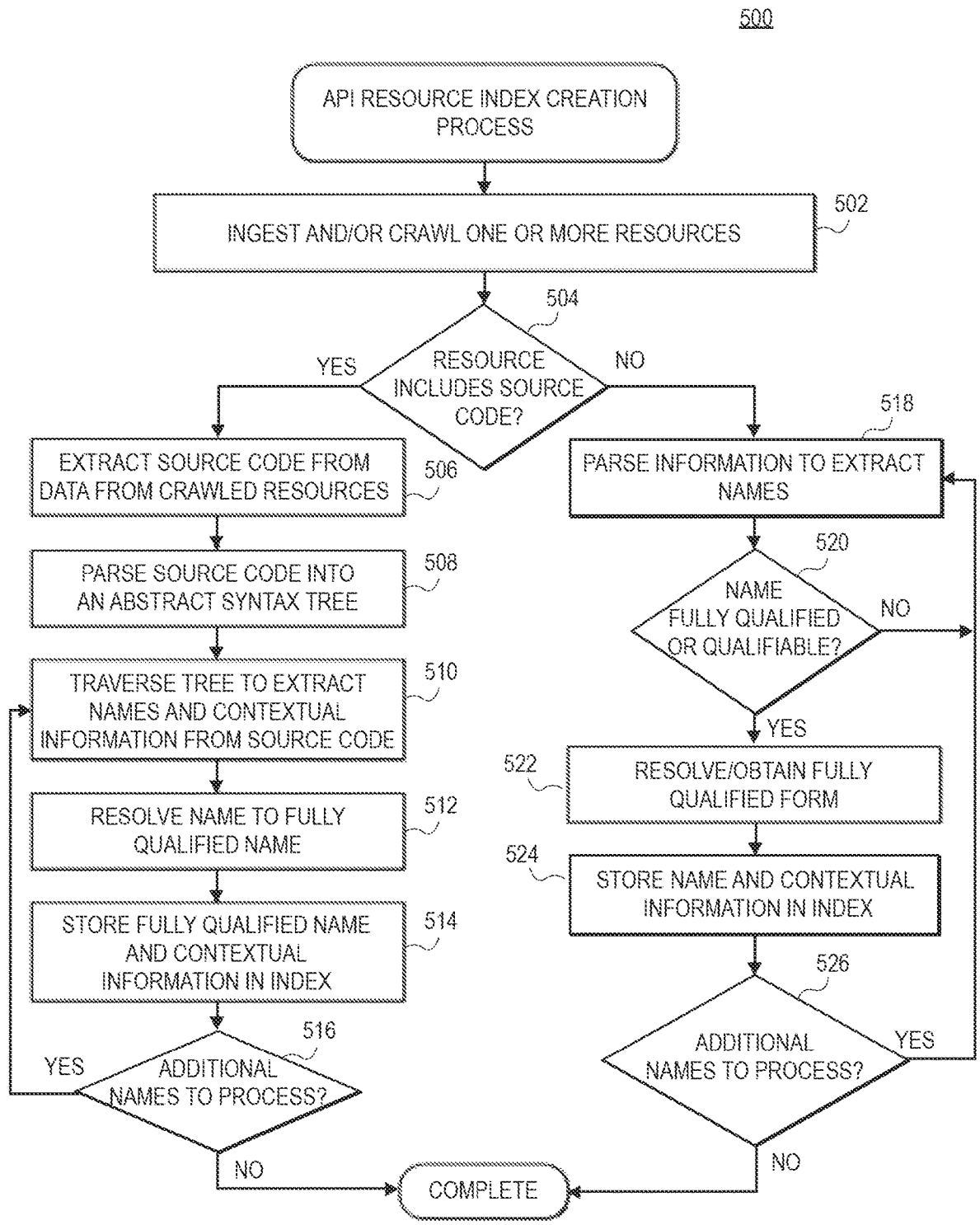
FIG. 5 is a flow diagram of an exemplary API resource index creation process, according to exemplary embodiments of the present disclosure.

FIG. 5 is a flow diagram of an exemplary API resource index creation process 500, according to exemplary embodiments of the present disclosure.

As shown in FIG. 5, exemplary API resource index creation process 500 may begin with the ingesting and/or crawling of certain resources (e.g., networked resources such as computing resources 220-1, 220-2, through 220-N) to obtain API resource information from one or more of the resources, as in step 502. For example, the resources that may be ingested and/or crawled to find API related content (such as source code, stack traces, code reviews/discussion, usage guide, etc.) may include published API documentation, source code repositories (e.g., GitHub, etc.), discussion forums (e.g., Stack Overflow, etc.), issue tracker platforms, code review platforms, blog posts, other websites, and the like. According to aspects of the present disclosure, any resource from which API resource information may be obtained may be ingested and/or crawled.

In step 504, it may be determined if the ingested and/or crawled information includes source code information. If the ingested and/or crawled information includes source code information, in step 506, the ingested and/or crawled resources are processed to extract source code embedded in the information from the ingested and/or crawled resources. For example, source code obtained from the various ingested and/or crawled resource may include packaged source code from source code repositories, source code obtained from discussion forums, blog posts, other websites, and the like. Accordingly, the source code extracted from the various ingested and/or crawled resources may be in the form of portions and/or snippets of source code that were embedded in such platforms.

Based on the understanding that identifier and/or elements of APIs (e.g., classes, functions, variables, etc.) may be identified using uniquely identifiable names, the source code extracted from the information ingested and/or crawled from the various resources may be further processed to extract names of identifiers and/or elements of APIs used in the extracted source code. As shown in FIG. 5, in step 508, the extracted source code may be parsed into an abstract syntax tree (AST). The AST may include a canonical form that can be used to analyze all declarations and usages of code identifiers, elements, entities, etc. in the extracted source code.

The AST may be traversed, as in step 510, to extract names and certain contextual information from the extracted source code. For example, the contextual information may include information such as dependencies, build manifests, folder structures, and the like. In step 512, the extracted names are preferably resolved to a fully qualified name, i.e., a form that provides the full hierarchical access path for the identified and/or extracted names regardless of where the name is being declared, defined, used, and the like. Accordingly, to resolve the extracted names to fully qualified names, various information and/or parameters associated with the identified and/or extracted names, such as dependencies, build manifests, folder structures, and the like, as well as any available natural language information (e.g., code comments, in discussion forums, blog posts, etc.) may be used, in addition to the information obtained via the traversal of the AST, in resolving names to a fully qualified form. Further, known API resource information may also be leveraged to resolve names to a fully qualified form. According to exemplary embodiments of the present disclosure, API documentation, resource information, and the like may be analyzed to determine contextual information associated with names appearing in the API documentation and/or resource information, which may also be utilized to facilitate resolving names to fully qualified form. For example, it may be determined from the API documentation and/or resource information how certain names are used, types/objects that certain expressions may return, any related and/or corresponding code elements (e.g., functions, variables, etc.), and if any such similar contextual information is identified in the non-source code information and/or the extracted source code information, such contextual information may be utilized to facilitate determination of the fully qualified names.

After the names have been extracted, and resolved to a fully qualified form where possible, the names and/or the fully qualified names, as well as certain contextual information, may be stored and/or otherwise maintained in an API resource information index, as in step 514. According to exemplary embodiments of the present disclosure, the additional parameters and/or information associated with the names that may also be stored in association with the names and/or the fully qualified names in the API resource information index can include, for example, classifications of the names and fully qualified names based on how the names and/or fully qualified names appear in the source code. This can include whether the names and/or fully qualified names are declared (e.g., identifiers and/or elements that are defined, introduced, and/or imported in the source code), used (e.g., used in the source code), and/or external (e.g., a subset of used names and/or fully qualified names that are used or defined in the same source code unit). It may be understood that the names and/or fully qualified names that are classified as external are typically associated with APIs.

Optionally, the names, fully qualified names, and/or the contextual information stored and/or maintained in the API resource information index may be further processed to generate identifiers that are representative of the names, fully qualified names, and/or the contextual information. Accordingly, the identifiers, rather than the actual names, fully qualified names, and/or the contextual information, may be stored in the API resource information index. For example, a trained machine learning model may be configured to generate embeddings representative of the names, fully qualified names, and/or the contextual information, and the embeddings may be stored and/or maintained in the API resource information index.

In step 516, it may be determined whether additional names extracted from the source code are to be processed. If there are additional names to process, exemplary API resource index creation process 500 may return to step 510. Otherwise, exemplary API resource index creation process 500 may complete. Further, exemplary API resource index creation process 500 may be periodically performed to continuously update and/or maintain the API resource information index.

Alternatively, if it is determined that the ingested and/or crawled information includes non-source code information, in step 518, the non-source code information may be parsed to extract names included in the non-source code information. The names may be identified and/or extracted, for example, based on contextual information, surrounding artifacts, and the like. Also based on the contextual information and surrounding artifacts, it may be determined, in step 520, it may be determined whether the identified names are in fully qualified form or are qualifiable based on such contextual information and surrounding artifacts.

If the names are not fully qualified and/or not qualifiable, process 500 may return to step 518. Alternatively, if the names are in fully qualified form and/or are qualifiable, the name may be resolved to fully qualified form and/or obtained in fully qualified form, as in step 522. After the names have been extracted, and resolved to a fully qualified form where possible, the names and/or the fully qualified names, as well as certain contextual information, may be stored and/or otherwise maintained in an API resource information index, as in step 524.

In step 526, it may be determined whether additional names extracted from the source code are to be processed. If there are additional names to process, exemplary API resource index creation process 500 may return to step 518. Otherwise, exemplary API resource index creation process 500 may complete. Further, exemplary API resource index creation process 500 may be periodically performed to continuously update and/or maintain the API resource information index.

Figure 6:
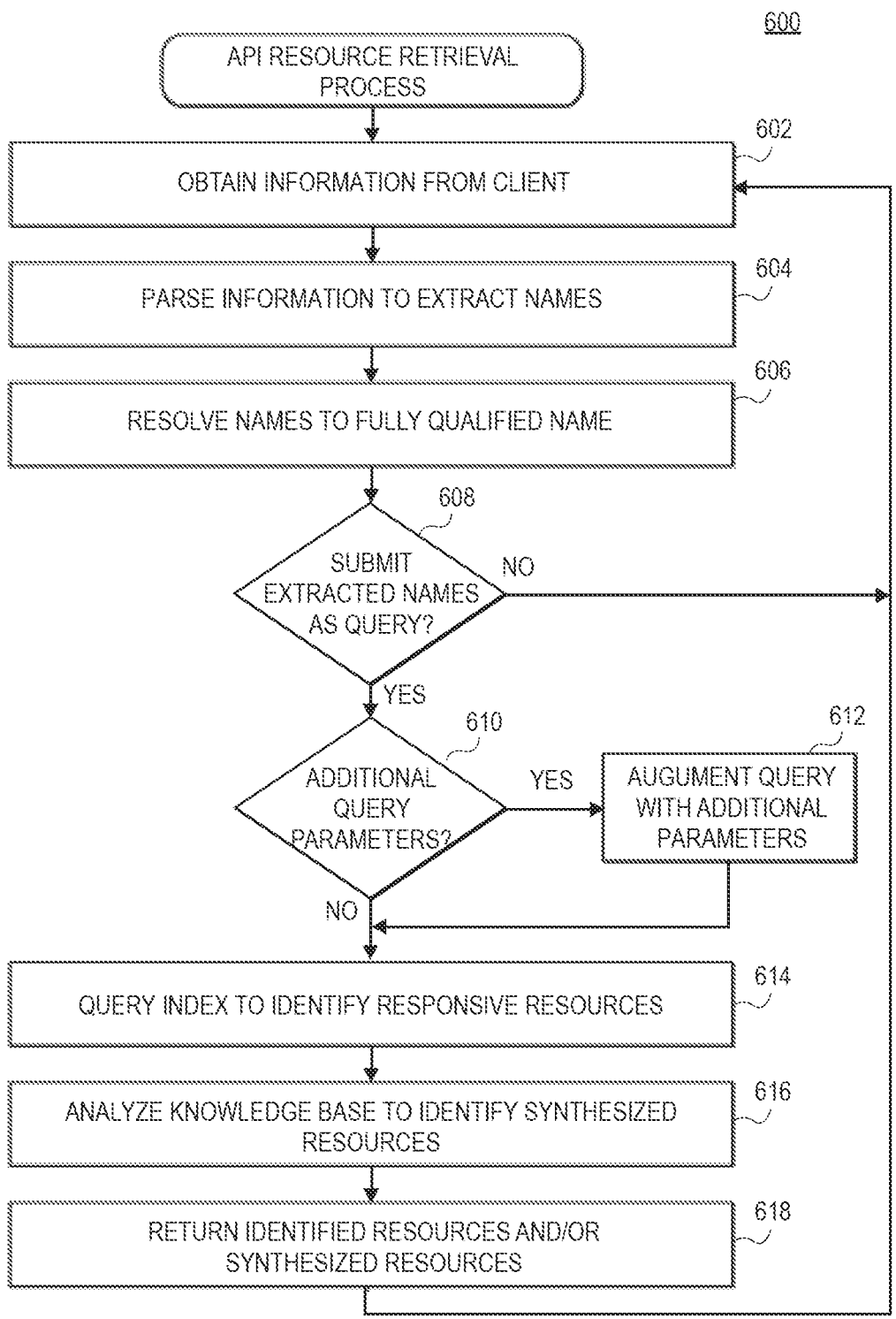
FIG. 6 is a flow diagram of an exemplary API resource information retrieval process, according to exemplary embodiments of the present disclosure.

FIG. 6 is a flow diagram of an exemplary API resource information retrieval process 600, according to exemplary embodiments of the present disclosure.

As shown in FIG. 6, exemplary API resource information retrieval process 600 may begin with obtaining information, such as source code information and/or non-source code information, as in step 602. According to exemplary embodiments of the present disclosure, as a user is developing source code using an integrated development environment, at least a portion of the source code being develop may be obtained and used to identify and retrieve relevant API resource information. Additionally, as a user consumes API related content (e.g., via a browser, etc.), the API related content may be obtained as non-source code information. For example, an application configured to obtain source code may be embedded and/or implemented as part of the IDE being used by the user to develop source code, and portions of the source code may be obtained and/or ingested by the application via various different mechanisms. According to aspects of the present disclosure, the application may be configured to run in the background of the IDE and automatically obtain and parse portions of the source code being developed by the user using the IDE, portions of the source code may be selected by the user and provided to the application by the user, portions of the source code may be provided to the application at run-time, compile-time, etc. and/or upon detection of an error, warning, fault, etc. at run-time, compile-time, etc., or execution of another command, and the like. Additionally, non-source code information may be obtained using a browser extension, plug-in, and the like.

According to exemplary embodiments of the present disclosure, the information may be further processed to extract names of identifiers and/or elements of APIs used in the obtained source code information and/or the non-source code information, as in step 604. The extracted source code information may be parsed into an abstract syntax tree (AST). The AST may include a canonical form that can be used to analyze all declarations and usages of code identifiers, elements, entities, etc. in the extracted source code. The AST may be traversed to extract names and certain contextual information from the extracted source code. For example, the contextual information may include information such as dependencies, build manifests, folder structures, and the like. Further, names may be extracted from non-source code information, based on contextual information (e.g., surrounding artifacts, etc.) included in the non-source code information.

The extracted names are preferably resolved to fully qualified names, as in step 606, which may include the full hierarchical access path for the identified and/or extracted names regardless of where the name is being declared, defined, used, and the like. Accordingly, to resolve the extracted names to fully qualified names, various information and/or parameters associated with the identified and/or extracted names, such as dependencies, build manifests, folder structures, contextual information associated with how the names are used in the source code, other contextual information, surrounding artifacts, and the like, as well as any available natural language information (e.g., code comments, in discussion forums, blog posts, etc.) may be used, in addition to the information obtained via the traversal of the AST, in resolving names to a fully qualified form.

In step 608, it may be determined whether the extracted names and/or fully qualified names are to be submitted as a query to search an API resource information index to identify and/or retrieve resource information based on the query. For example, the user may be presented with a proposed query including the extracted names and/or fully qualified names and be given the option of whether to proceed with the query, modify the query, and the like. If the extracted names are not to be submitted as a query, exemplary API resource information retrieval process 600 may return to step 602.

However, if the extracted names are to be submitted as a query, in step 610 it may be optionally determined if additional query parameters are to be added to augment and/or supplement the query. For example, the user may be prompted to include a natural language search in addition to the one or more names and/or fully qualified names that are provided as the query, the user may be able to select or deselect the names and/or fully qualified names to be submitted as the query, the user may be able to select Boolean operators in connection with the names and/or fully qualified names to be submitted as the query, and the like. Accordingly, if the query is to be augmented with additional parameters, the query may be augmented with such additional parameters in step 612.

In step 614, the query may be used to search the API resource information index to identify and/or retrieve API resources identified to be relevant to the query. For example, the query may be performed as a lexical search, a semantic search, and the like. In exemplary implementations where embeddings are used to represent the queries, searching the API resource information index may include determining similarity measures between the relevant embeddings (e.g., cosine similarity, employing clustering techniques, and the like).

Advantageously, exemplary implementations of the present disclosure can identify API resource information in connection with more than one API that may be used in combination in the source code being developed by the user. For example, in exemplary implementations where the user may be utilizing more than one API in combination, the query may include names and/or fully qualified names associated with more than one API so that API resource information associated with a combination of multiple APIs may be identified and provided to the user. Further, the natural language searching option that may augment the query of names and/or fully qualified names may facilitate determining an intent of the user in connection with the APIs associated with the names and/or fully qualified names included in the query. In exemplary implementations, the user can supplement the query of names and/or fully qualified names with a natural language query to indicate the purpose of the API, certain information and/or examples that the user is seeking in connection with the APIs used in the source code being developed, and the like. For example, in an example implementation where the user is developing source code to migrate from one system to another, the user may indicate as such in as a natural language input. In response to such a natural language input, exemplary embodiments of the present disclosure may identify and retrieve API resource information identifying APIs associated with the new system to which the systems are migrating that perform similar functions to APIs associated with the names and/or fully qualified names extracted from the source code that are included as part of the query.

In step 616, the API resource information may also be analyzed to determine whether any synthesized resources may be inferred from the API resource information. For example, this can include inferences of relationships between APIs, similarities between APIs, frequencies in being collectively identified as responsive API resource information, and the like.

In step 618, API resource information responsive to the query, as well as any synthesized API resource information, may be identified, retrieved, and/or returned. After responsive API resource information is identified and/or retrieved, the API resource information, identifiers associated with the API resource information, and the like may be presented to the user. For example, the API resource information may include example source code, as well as non-source code examples, such as blog posts, discussion forums, and the like, and may be implemented into and presented as part of the user interface of the IDE, cause another application (e.g., browser, etc.) to be executed and present the API resource information in the other application, and the like. Further, only portions of particular API resource information (e.g., the portions within the API resource information that include the relevant information corresponding to the names used to search the index) may be retrieved and/or presented to the user. Accordingly, the user may access, interact with, or otherwise consume the API resource information. Optionally, aspects of the present disclosure can present a query refinement option so that the user can submit a refinement query (e.g., submit a further API name and/or fully qualified name, a natural language search, select one or more of the presented API resource information and request additional similar results, and the like) to refine and/or filter the API resource information that was identified, retrieved, and presented to the user.

Figure 7:
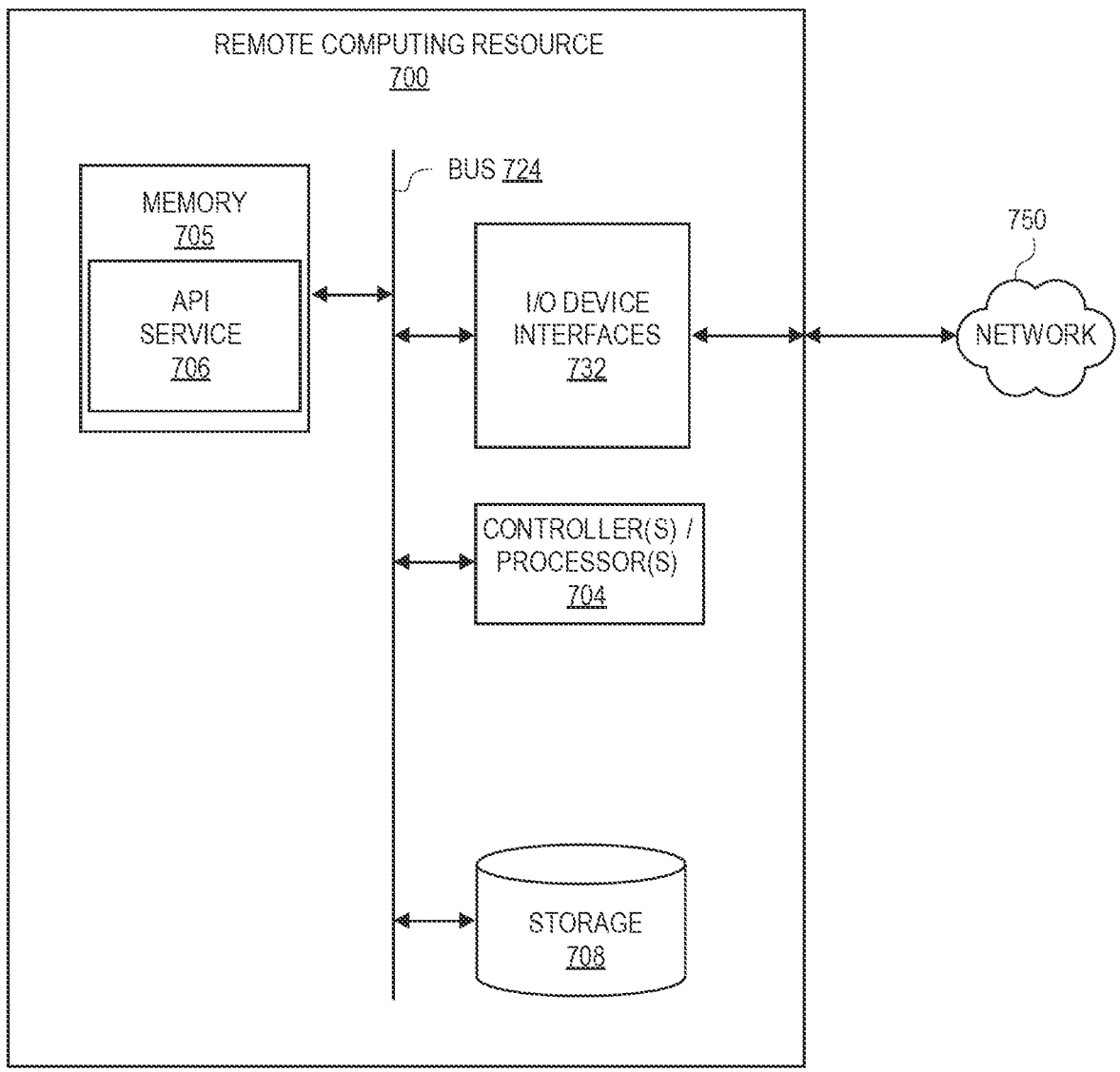
FIG. 7 is a block diagram of an exemplary computing resource, according to exemplary embodiments of the present disclosure.

FIG. 7 is a block diagram conceptually illustrating example components of a server and/or remote computing device, such as remote computing resource 700 on which exemplary embodiments of the present disclosure may be executed. Multiple such remote computing resources 700 may be included in the system.

Each remote computing resource 700 may include one or more controllers/processors 704, that may each include a central processing unit (CPU) for processing data and computer-readable instructions, and memory 705 for storing data and instructions. Memory 705 may individually include volatile random-access memory (RAM), non-volatile read-only memory (ROM), non-volatile magnetoresistive (MRAM) and/or other types of memory. Each server may also include a data storage component 708, for storing data, controller/processor-executable instructions, API resource information, names and/or fully qualified names, an API resource information index, location identifiers of networked API resource information to be ingested and/or crawled, etc. Each data storage component 708 may individually include one or more non-volatile storage types, such as magnetic storage, optical storage, solid-state storage, etc. Each remote computing resource 700 may also be connected to removable or external non-volatile memory and/or storage (such as a removable memory card, memory key drive, networked storage, etc.), internal, and/or external networks 750 (e.g., the Internet) through respective input/output device interfaces 732.

Computer instructions for operating each remote computing resource 700 and its various components may be executed by the respective server's controller and/or processor(s) 704, using the memory 705 as temporary "working" storage at runtime. Remote computing resource 700's computer instructions may be stored in a non-transitory manner in non-volatile memory 705, data storage component 708, and/or an external device(s). Alternatively, some or all of the executable instructions may be embedded in hardware or firmware on the respective device, in addition to or instead of software.

For example, memory 705 may store program instructions that when executed by the controller(s)/processor(s) 704, cause the controller(s)/processors 704 to process API resource information using API service 706 to build and/or maintain an API resource index, as well as identify and/or retrieve API resource information, as discussed herein.

Each remote computing resource 700 includes input/output device interfaces 732. A variety of components may be connected through the input/output device interfaces. Additionally, each remote computing resource 700 may include address/data bus 724 for conveying data among components of the respective server. Each component within remote computing resource 700 may also be directly connected to other components, in addition to (or instead of) being connected to other components across bus 724.

The components of remote computing resource 700, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 5 and 6, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer-readable storage medium. The computer-readable storage medium may be readable by a computer and may comprise instructions for causing a computer or other device to perform processes described in the present disclosure. The computer-readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or non-volatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:
   one or more processors; and
   a memory storing program instructions that, when executed by the one or more processors, cause the one or more processors to at least:
      receive, from a plurality of networked resources, a plurality of information associated with a plurality of application programming interfaces (APIs);
      process the plurality of information to extract a first plurality of names embedded in the plurality of information;
      store, in a datastore, the first plurality of names in an index of API resource information in association with at least a portion of the plurality of information;
      obtain, from a client device, source code information associated with source code being developed in an integrated development environment (IDE) executing on the client device;
      process the source code information to extract a second plurality of names embedded in the source code information;
      generate a query that includes at least a portion of the second plurality of names;
      search, using the query, the index of API resource information to identify a third plurality of names from the first plurality of names that correspond to the at least a portion of the second plurality of names included in the query;
      retrieve, from the database and based at least in part on the query and the index of API resource information, API resource information stored in association with the third plurality of names as responsive API resource information; and
      cause at least a portion of the responsive API resource information to be presented on the client device.

2. The computing system of claim 1, wherein the plurality of networked resources includes at least one of:
   source code repositories;
   API publication hosts;
   discussion forums;
   source code issue tracking platforms; or
   source code review platforms.

3. The computing system of claim 1, wherein processing the plurality of information to extract the first plurality of names embedded in the plurality of information includes:
   processing the plurality of information to extract second source code embedded in the plurality of information;
   generating, based at least in part on the second source code, an abstract syntax tree representing a structure of the second source code; and
   traversing the abstract syntax tree to identify the first plurality of names from the second source code.

4. The computing system of claim 1, wherein:
   processing the plurality of information to extract the first plurality of names embedded in the plurality of information includes resolving at least a portion of the first plurality of names to corresponding fully qualified names; and
   each corresponding fully qualified name includes a respective hierarchical access path for a corresponding name of the first plurality of names.

5. The computing system of claim 1, wherein:
   the program instructions that, when executed by the one or more processors, further cause the one or more processors to at least generate, using a trained machine learning model, an embedding representative of the query.

6. A computer-implemented method, comprising:
   receiving, from a client device, a plurality of information, wherein the plurality of information includes source code information associated with source code being developed in an integrated development environment (IDE);
   extracting a first plurality of names embedded in the plurality of information;
   resolving at least a portion of the first plurality of names to a plurality of fully qualified names;
   generating a query including at least a portion of the first plurality of names and the plurality of fully qualified names;
   searching, based at least in part on the query, an index of application programming interface (API) resource information to identify a second plurality of names that correspond to the at least a portion of the first plurality of names and the plurality of fully qualified names;
   retrieving, from a datastore, first API resource information from a plurality of API resource information maintained in the index, wherein the first API resource information is stored in association with the second plurality of names in the index; and causing at least a portion of the first API resource information to be presented on the client device.

7. The computer-implemented method of claim 6, wherein:
extracting the first plurality of names embedded in the plurality of information includes:
generating, based at least in part on the source code information, an abstract syntax tree representing a structure of the source code information; and
traversing the abstract syntax tree to identify the first plurality of names from the plurality of information.

8. The computer-implemented method of claim 6, wherein:
the plurality of information includes non-source code information; and
extracting the first plurality of names embedded in the plurality of information is based at least in part on contextual information.

9. The computer-implemented method of claim 6, further comprising:
determining a classification corresponding to each of the first plurality of names, wherein the classification includes at least one of:
a first indication of a use of the name;
a second indication of a declaration of the name; or
a third indication that the name is associated with an external source.

10. The computer-implemented method of claim 6, further comprising:
receiving, from the client device, an additional query parameter to augment the query, wherein:
searching the index of API resource information is further based at least in part on the additional query parameter and the first API resource information is responsive to the query and the additional query parameter.

11. The computer-implemented method of claim 6, wherein:
the query includes at least a first name associated with a first API and a second name associated with a second API; and
the first API resource information includes information associated with using the first API and the second API in combination.

12. The computer-implemented method of claim 11, wherein the first API is associated with a first file and the second API is associated with a second file.

13. The computer-implemented method of claim 6, wherein
the query includes at least a first name associated with a first API; and
the first API resource information includes information associated with a second API that performs similar functions to that of the first API.

14. The computer-implemented method of claim 6, wherein the first API resource information includes source code example information and non-source code example information.

15. A computing system, comprising:
one or more processors; and
a memory storing program instructions that, when executed by the one or more processors, cause the one or more processors to at least:
receive, from a plurality of networked resources, a plurality of information associated with a plurality of application programming interfaces (APIs);
process the plurality of information to extract a first plurality of names included in the plurality of information;
resolve the first plurality of names to a first plurality of fully qualified names;
store, in a database, the first plurality of names and the first plurality of fully qualified names in an index of API resource information in association with at least a portion of the plurality of information;
receive, from a client device, a second plurality of information, wherein the second plurality of information is associated with source code being developed in an integrated development environment (IDE);
process the second plurality of information to extract a second plurality of names embedded in the second plurality of information;
resolve the second plurality of names to a second plurality of fully qualified names;
generate a query that includes at least a portion of the second plurality of names and the second plurality of fully qualified names;
search, based at least in part on the query, the index of API resource information to identify a third plurality of names from the first plurality of names and the first plurality of fully qualified names that correspond to the at least a portion of the second plurality of names and the second plurality of fully qualified names included in the query;
retrieve, from the database and in response to the query, first API resource information that is stored in association with the third plurality of names;
and
cause at least a portion of the first API resource information to be presented on the client device.

16. The computing system of claim 15, wherein the first API resource information includes synthesized API resource information.

17. The computing system of claim 15, wherein:
the program instructions that, when executed by the one or more processors, further cause the one or more processors to at least:
generate, using a trained machine learning model, a first plurality of embeddings corresponding to the first plurality of names and the first plurality of fully qualified names representative of the first plurality of names and the first plurality of fully qualified names; and
generate, using the trained machine learning model, a query embedding representative of the query; and
searching the index of API resource information includes determining a similarity measure between at least a portion of the first plurality of embeddings and the query embedding.

18. The computing system of claim 15, wherein:
the query includes at least a first name associated with a first API and a second name associated with a second API; and
the first API resource information includes information associated with using the first API and the second API in combination.

19. The computing system of claim 15, wherein receiving the second plurality of information includes at least one of:
monitoring development of source code in the IDE;
a user interaction with the IDE;
a detection of an error condition in connection with the source code obtaining first non-source code information using a browser extension; or obtaining second non-source code information using a plug-in.

\* \* \* \* \*